United States Patent
Lin et al.

(10) Patent No.: US 8,320,625 B2
(45) Date of Patent: *Nov. 27, 2012

(54) METHOD AND APPARATUS FOR DETECTING MOTION OF IMAGE IN OPTICAL NAVIGATOR

(75) Inventors: Choyi Lin, Hsin-chu (TW); Minghui Kuo, Hsin-chu (TW)

(73) Assignee: Pixart Imaging Inc., Hsinchu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 13/224,588

(22) Filed: Sep. 2, 2011

(65) Prior Publication Data
US 2012/0020520 A1    Jan. 26, 2012

Related U.S. Application Data

(63) Continuation of application No. 11/380,796, filed on Apr. 28, 2006, now Pat. No. 8,036,428.

(51) Int. Cl.
*G06K 9/00*    (2006.01)

(52) U.S. Cl. ..................................................... 382/103
(58) Field of Classification Search ................. 345/158; 375/240; 348/549
See application file for complete search history.

(56) References Cited

U.S. PATENT DOCUMENTS

| | | | |
|---|---|---|---|
| 6,212,237 B1 * | 4/2001 | Minami et al. | 375/240.16 |
| 6,483,874 B1 * | 11/2002 | Panusopone et al. | 375/240.08 |
| 6,859,199 B2 * | 2/2005 | Shi | 345/166 |
| 2004/0046891 A1 * | 3/2004 | Mishima et al. | 348/459 |
| 2004/0101058 A1 * | 5/2004 | Sasai et al. | 375/240.26 |
| 2005/0100095 A1 * | 5/2005 | Itoh et al. | 375/240.16 |

* cited by examiner

*Primary Examiner* — Amara Abdi
(74) *Attorney, Agent, or Firm* — WPAT, P.C.; Anthony King

(57) ABSTRACT

A system and method for determining a motion vector uses both a main block from an image and at least one ancillary block relating to the main block from the image. The main block and ancillary block are then tracked from image to image to provide a motion vector. The use of a composite tracking unit allows for more accurate correlation and identification of a motion vector.

22 Claims, 19 Drawing Sheets

Sensor Array

FIG. 4A
FIG. 4B
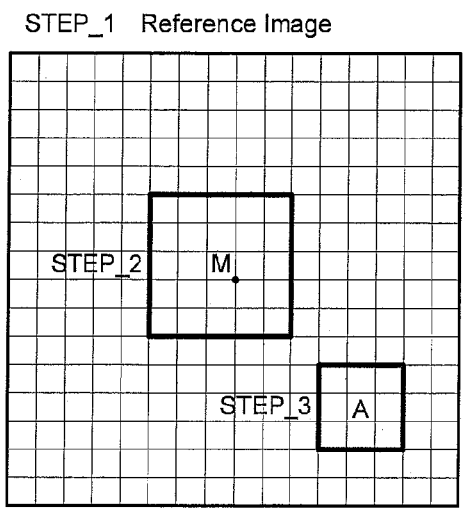
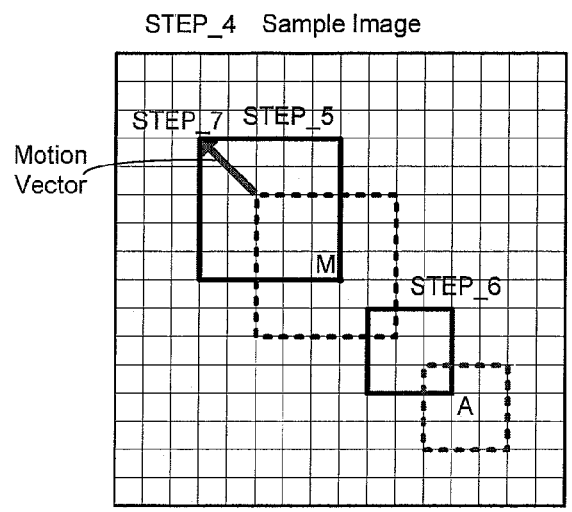

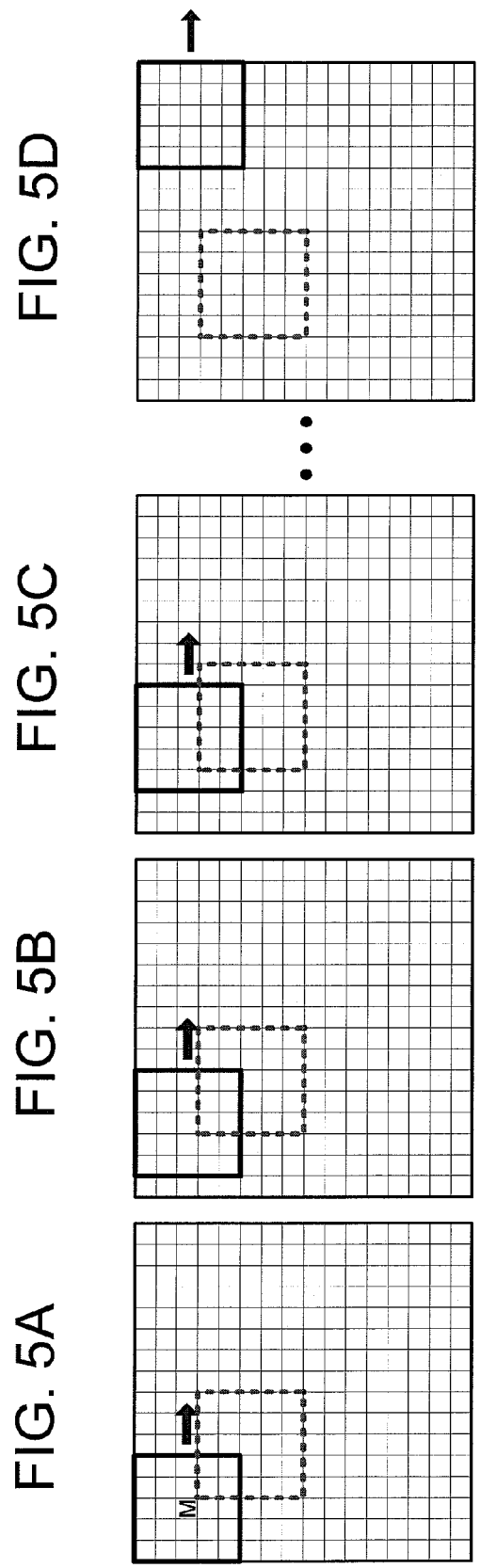

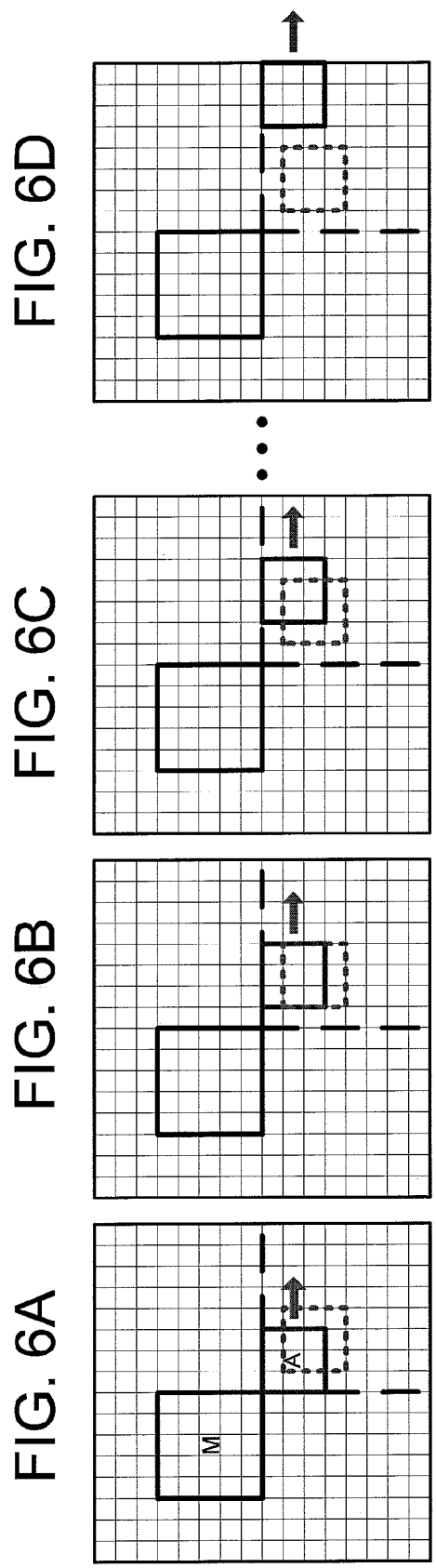

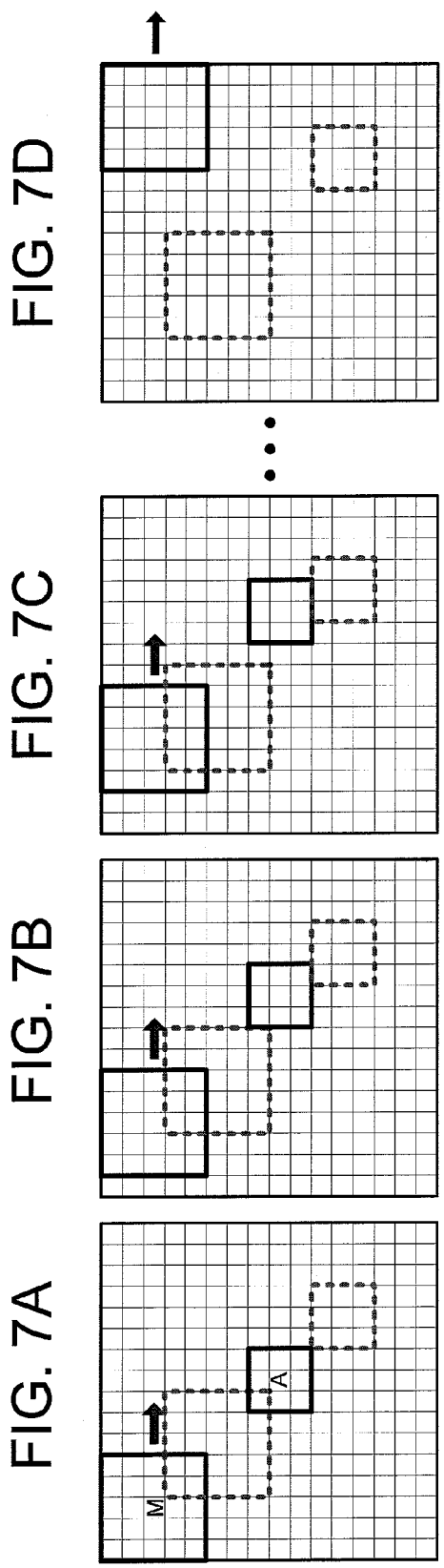

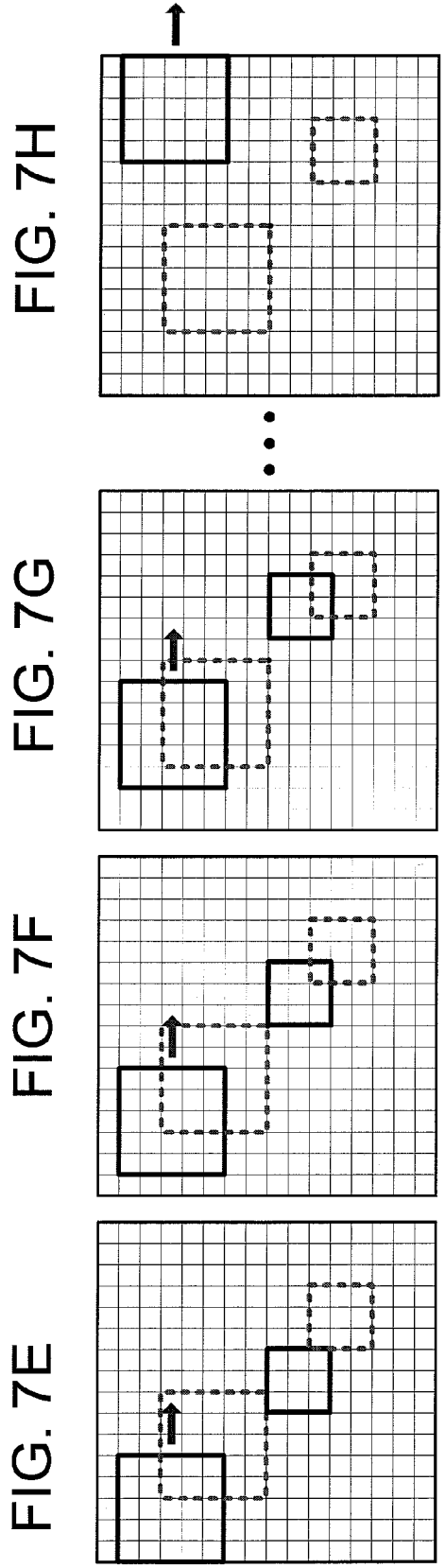

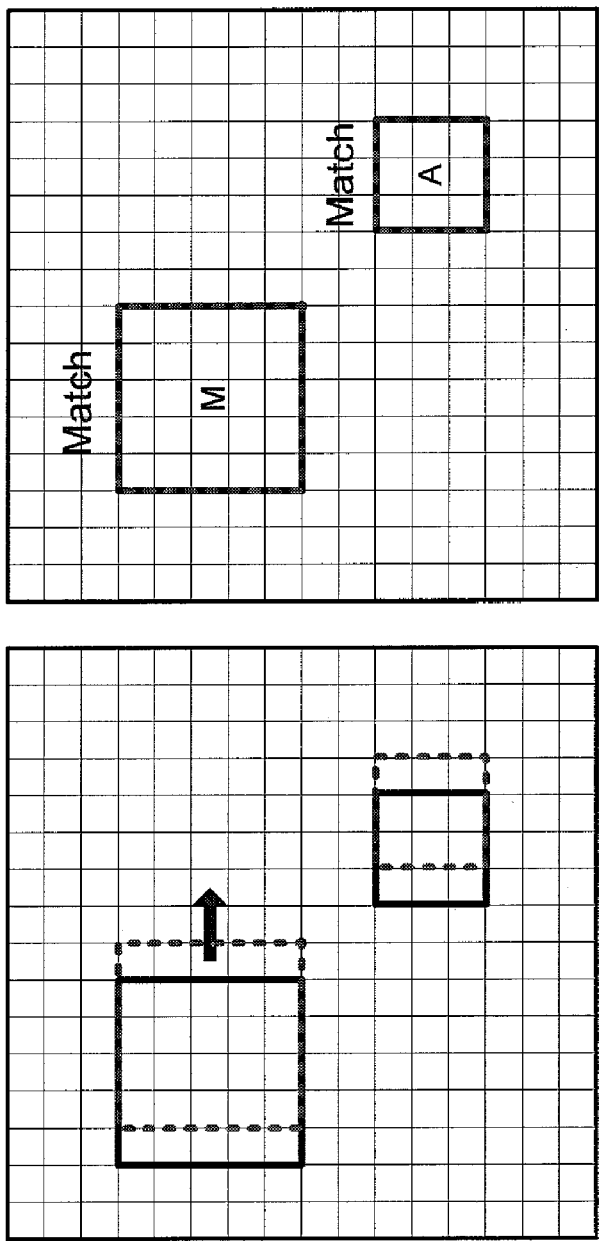

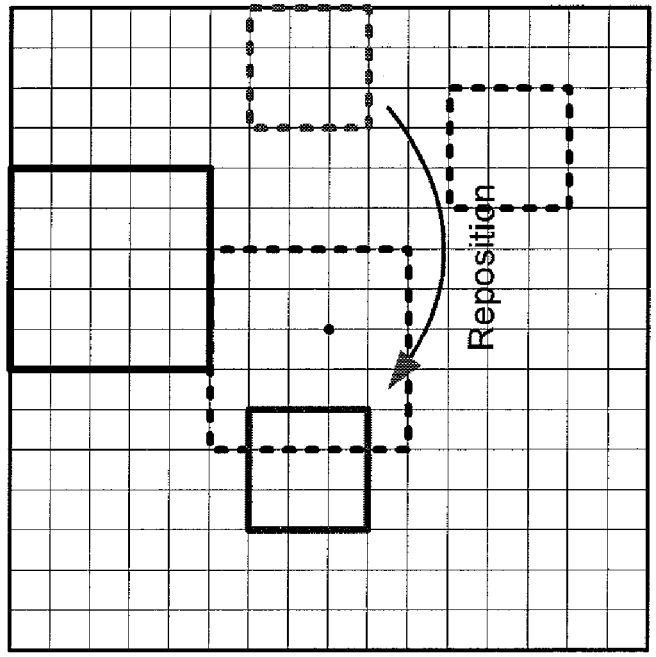
FIG. 8D
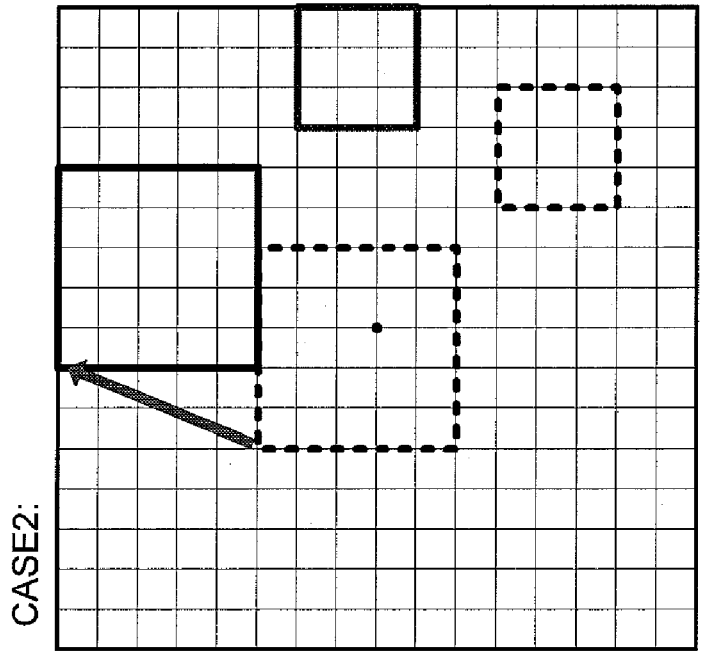
FIG. 8C

FIG. 9A

CASE1

| 25 | 25 | 26 | 25 | 26 | 25 | 26 | 25 | 26 | 25 | 25 | 25 | 26 | 25 | 26 | 25 | 25 |
|---|---|---|---|---|---|---|---|---|---|---|---|---|---|---|---|---|
| 27 | 25 | 24 | 25 | 24 | 25 | 25 | 25 | 28 | 25 | 27 | 26 | 24 | 27 | 24 | 26 | 25 |
| 25 | 25 | 25 | 25 | 27 | 25 | 27 | 24 | 23 | 27 | 25 | 24 | 25 | 25 | 25 | 24 | 25 |
| 24 | 24 | 25 | 25 | 26 | 25 | 26 | 25 | 25 | 26 | 27 | 27 | 25 | 27 | 25 | 25 | 24 |
| 26 | 25 | 26 | 26 | 25 | 26 | 25 | 25 | 25 | 25 | 26 | 24 | 25 | 25 | 26 | 26 | 25 |
| 28 | 25 | 24 | 24 | 25 | 24 | 27 | 26 | 28 | 27 | 25 | 25 | 25 | 27 | 24 | 24 | 25 |
| 25 | 25 | 25 | 25 | 25 | 26 | 25 | 24 | 23 | 24 | 23 | 26 | 25 | 25 | 25 | 25 | 25 |
| 24 | 25 | 24 | 24 | 27 | 24 | 27 | 23 | 25 | 25 | 25 | 25 | 27 | 24 | 25 | 25 | 25 |
| 25 | 25 | 26 | 27 | 23 | 26 | 25 | 25 | 25 | 25 | 25 | 24 | 23 | 25 | 25 | 24 | 25 |
| 27 | 24 | 25 | 25 | 26 | 24 | 26 | 26 | 26 | 27 | 27 | 26 | 26 | 25 | 26 | 25 | 25 |
| 24 | 25 | 27 | 25 | 24 | 24 | 27 | 27 | 25 | 25 | 25 | 24 | 25 | 26 | 26 | 26 | 24 |
| 25 | 25 | 25 | 26 | 29 | 30 | 30 | 32 | 43 | 56 | 70 | 72 | 51 | 59 | 64 | 70 | 72 |
| 25 | 27 | 26 | 27 | 30 | 34 | 37 | 38 | 44 | 40 | 45 | 48 | 59 | 58 | 70 | 73 | 88 |
| 26 | 25 | 29 | 30 | 32 | 35 | 36 | 45 | 46 | 42 | 49 | 55 | 60 | 75 |

FIG. 9B (reshape the ancillary block)

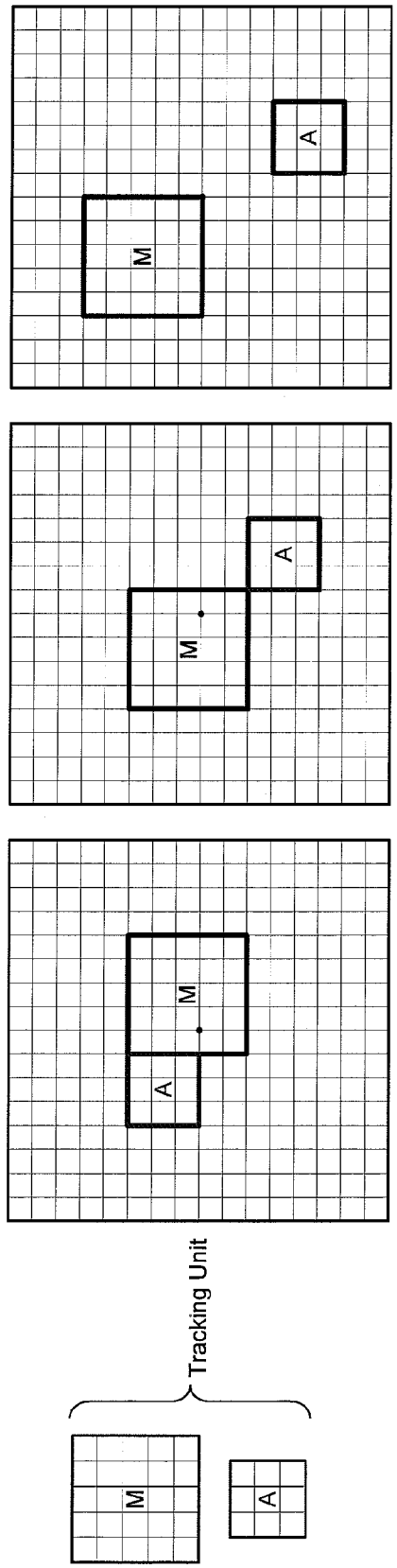

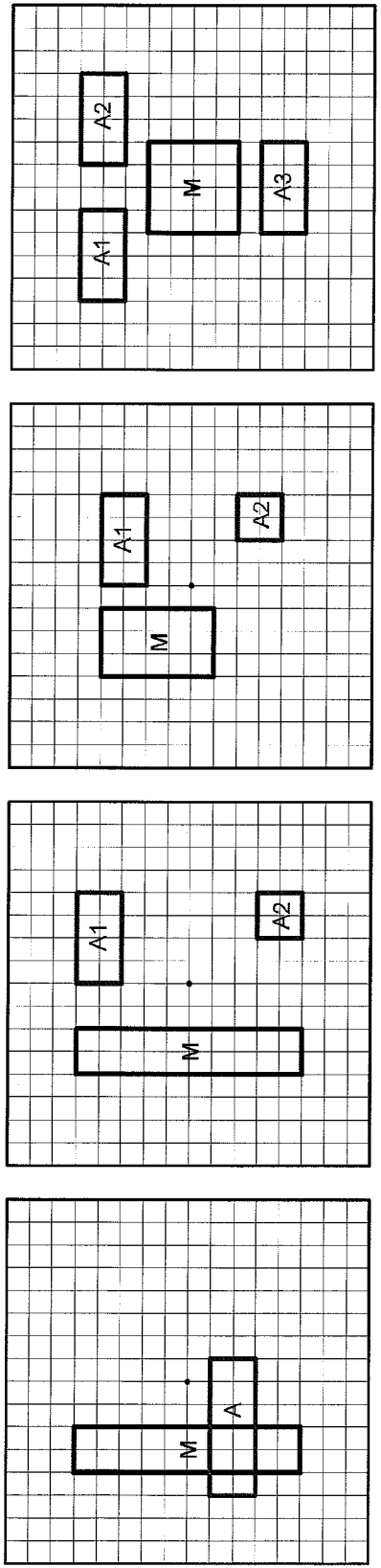

METHOD AND APPARATUS FOR DETECTING MOTION OF IMAGE IN OPTICAL NAVIGATOR

This is continuation of application Ser. No. 11/380,796, filed on Apr. 28, 2006.

BACKGROUND OF THE INVENTION

1. Field of the Invention

The present invention relates to optical imaging and motion detection. The invention has particular applicability to integrated circuits and firmware used in optical handheld pointing devices, such as a computer mouse.

2. Description of the Related Art

The prior art includes a number of different techniques for estimating and detection motion of an image principally by comparing successive images in time to detect motion. These include:

U.S. Pat. No. 6,859,199 incorporated by reference herein, works primarily through feature extraction. The disclosed algorithm works by:

- Extracting a first feature set from a first image and a second feature set from a second image subsequent in time to the first image;
- Comparing the first feature set to the second feature set to determine a shift in position of the second image relative to the first image;
- Outputting a motion vector based upon the shift in position.

The drawbacks of this technique include the fact that there must be a fairly large number of elements in the first and the second feature sets to determine the motion vector accurately.

U.S. Pat. No. 5,729,008 and U.S. Pat. No. 5,786,804 both also incorporated by reference herein, disclose a form of block matching which operates as follows:

- Capturing a first frame and a second frame;
- Correlating the signals of the first frame to the signals of the second frame;
- Generating a correlation output of the motion.

The drawback of this approach is that, when using only one block to perform block-matching method, the elements in this block must be sufficient to ensure accuracy of matching. Moreover the larger this block gets, the more complicated a computation and memory also becomes.

SUMMARY OF THE INVENTION

An object of the present invention, therefore, is to overcome the aforementioned limitations of the prior art.

Another object is to implement an image tracking method/system which has improved accuracy while not requiring significant computation time, memory, etc.;

A further object is to provide an image tracking system/method which uses a logical tracking unit which is a composite of two or more separate physical reference units;

A related object is to provide an image tracking system/method which uses a logical tracking unit which can be varied if needed on a dynamic basis;

Still another object is to provide an image tracking system/method that reduces computation and tracking errors due to topographical variations, light variations, etc. which may be localized under a sensor array, by using a supplemental tracking unit which affords redundancy in a motion tracking computation.

A first aspect of the invention concerns a system and method of determining a motion vector associated with a set of moving images using an electronic image sensor. This includes: capturing a first image corresponding to a first region; determining a main block from the first image including a main block region which is smaller than the first region; and determining at least one ancillary block relating to the main block from the first image the ancillary block including an ancillary block region which is also smaller than the first region (in this instance the main block and the ancillary block form a tracking unit in the first image); capturing a second image subsequent in time to the first image using the image sensor; correlating the first image to the second image using the tracking unit to determine a change in position of the tracking unit between images; and outputting the motion vector based upon the change in position. In some applications the tracking unit includes a plurality of separate ancillary blocks, and they include at least two blocks which differ in size and/or shape. Typically the main block is selected from a middle region of the first image; in some instances it may have a different shape than the ancillary block.

In preferred embodiments the process of correlating comprises:

block matching of the main block of the first image in the second image to determine a shift in position of the main block in the second image relative to the first image; and double checking by the ancillary blocks of the first image in the second image to confirm the shift in position of the second image relative to the first image. The correlating is terminated upon detecting a correlation that exceeds a controllable, programmable threshold value. In some embodiments the main block and the ancillary block are combined so that the correlating is performed at the same time for both the main block and the ancillary block.

Other aspects of the invention are directed to an ancillary block which is preferably smaller in area than the main block, and positioned apart from the main block by an intermediate region which is at least one pixel wide. Nonetheless the two blocks and overlap as well. Furthermore to determine the ancillary blocks, it is preferable to evaluate a candidate set of ancillary blocks by comparing pixel values of the candidate set of ancillary blocks to the main block. In some environments it may be desirable to select an ancillary block by determining which candidate block varies most from a main block (i.e., by pixel intensity value or similar parameter).

Another aspect of the invention concerns an ancillary block that is also preferably repositioned at various times within the image. This can be done based on an analysis of a position of such ancillary block within the second image, or by reference to an analysis of the motion vector.

Still another aspect is an ancillary block which is also preferably reshaped at various times within the image. This can be done based on an analysis of optical characteristics of the ancillary block region relative to optical characteristics of the main block region, and/or based on an analysis of the motion vector.

Another aspect of some embodiment is that a predicted location of the main block and/or the ancillary block is computed within the second image. The correlating can thus begin in a limited region at and/or around the predicted location.

Other aspects of the invention relate to a motion vector that is based preferably on detecting a first shift in position in the main block and a second shift in position in the ancillary block, and computing an estimated shift in position based on the first shift and the second shift. The estimated shift can be a weighted average of the first shift and the second shift.

Another aspect of the invention concerns a motion method for determining the relative motion of an optical tracking device comprising an imaging sensor, comprising the steps of: capturing a first image consisting of an array of pixel values respectively representing a light intensity perceived by the imaging sensor; selecting a first block in the array of pixel values and at least one additional feature which is in a predetermined relationship with the first block, to construct a first tracking unit; capturing a second image subsequent in time to the first image; detecting a second tracking unit within the second image which best matches the first tracking unit in the first image; determining a relative motion from the first image to the second image according to a displacement between the first tracking unit and the second tracking unit; and reporting a motion of the optical tracking device based on one or more accumulated relative motion of images captured by the imaging sensor.

A related aspect of the invention is directed to an optical navigator system comprising: an image sensor array adapted to capture a first image corresponding to a first region and a second image subsequent in time corresponding to a second region; and a processing circuit which is adapted to:

a. determine a main block from the first image including a main block region which is smaller than the first region;

b. determine at least one ancillary block relating to the main block from the first image the ancillary block including an ancillary block region which is also smaller than the first region;

c. form a tracking unit including the main block and the ancillary block;

d. correlate the first image to the second image using the tracking unit to determine a change in position of the tracking unit between images;

e. output the motion vector based upon the change in position.

The optical navigator system preferably consists of one or more integrated circuits, is housed within a pointing device, and is coupled to a computing system which operates based on the tracking unit. In most cases the processing circuit includes a DSP and a set of executable program instructions.

Still another aspect of the invention concerns an optical navigator comprising an image sensor configured to capture a first image and a second image; means for determining a main block from the first image; means for determining one or more ancillary block(s) relating to the main block from the first image; wherein the main block and the one or more ancillary block(s) form a tracking unit in the first image; means for capturing a second image subsequent in time to the first image using the image sensor; means for correlating the first image to the second image using the tracking unit of the first image. The process of correlating comprises: matching the main block of the first image to a location in the second image to determine a change in position of the second image relative to the first image; and verifying the change in position by identifying a location of the one or more ancillary blocks in the second image relative to the first image. In addition, means for outputting the motion vector based upon the change in position are provided.

It will be understood from the Detailed Description that the inventions can be implemented in a multitude of different embodiments. Furthermore, it will be readily appreciated by skilled artisans that such different embodiments will likely include only one or more of the aforementioned aspects and objects of the present inventions. Thus, the absence of one or more of such characteristics in any particular embodiment should not be construed as limiting the scope of the present inventions. While described in the context of an optical mouse, it will be apparent to those skilled in the art that the present teachings could be used in any system which utilizes image capture as a basis for estimating motion of an object.

BRIEF DESCRIPTION OF THE DRAWINGS

The invention will be described according to the appended drawings in which:

FIGS. 4A-4B are a graphical depiction of a preferred embodiment of an overall image capturing process in accordance with the present invention;

FIGS. 5A-5J are a graphical depiction of a preferred embodiment of a main or primary block matching process implemented in accordance with the present invention;

FIGS. 6A-6F are a graphical depiction of a preferred embodiment of a secondary/supplemental or ancillary block matching process implemented in accordance with the present invention;

FIGS. 7A-7J are a graphical depiction of a preferred embodiment of a composite (main & secondary together) block matching process implemented in accordance with the present invention;

FIGS. 8A-8F are a graphical depiction of a preferred embodiment of an ancillary block repositioning process implemented in accordance with the present invention;

FIGS. 9A-9B are a graphical depiction of a preferred embodiment of an ancillary block reshaping process implemented in accordance with the present invention; and FIGS. 10A-10K are a graphical depiction of a number of exemplary variants of a tracking unit which can be used in accordance with the present invention.

DETAILED DESCRIPTION OF THE INVENTION

Figure 1:
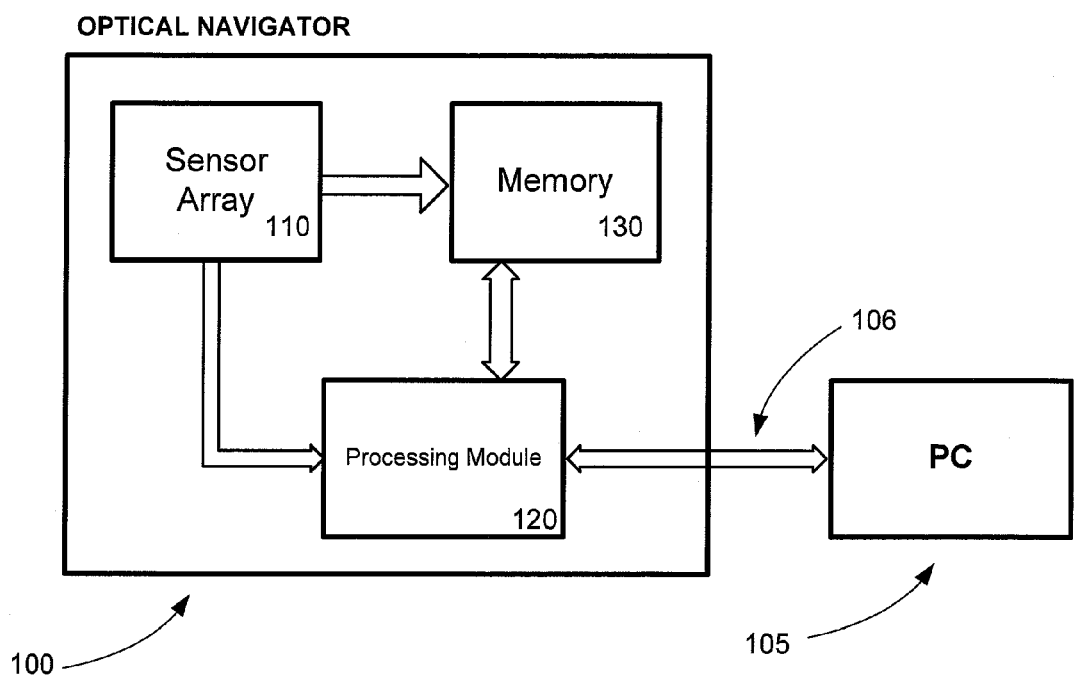
FIG. 1 is a basic block diagram of a preferred embodiment of an optical navigator system constructed in accordance with the teachings of the present invention.

A preferred embodiment of an optical navigation system 100 for tracking motion of an object is shown in FIG. 1. A sensor array 110 is coupled to both a processing module 120 and memory 130. Typically in an optical mouse application these circuits are embodied in one or more integrated circuits which are mounted on a printed circuit board (not shown) or other substrate along with other supporting structures, such as lenses, lighting (LED, laser, etc.) and other well-known components which are omitted for clarity.

The processing module 120 in turn consists of a number of well-known hardware and software components, including semiconductor based processing gates and programmable firmware for implementing the inventive processes described herein. Again, in an optical mouse application, a motion vector is typically transmitted either by a cable link or wireless connection over a communications channel 106 to a personal computer 105, or some other electronic processing device. For other applications the processing module 120 may be integrated as part of a (preferably handheld) pointing device 100 which cooperates to provide motion related signals to a different type of platform, such as a video game console, an audio/visual entertainment system, or some other interactive computing device. Other embodiments will be apparent to those skilled in the art.

Figure 2A:
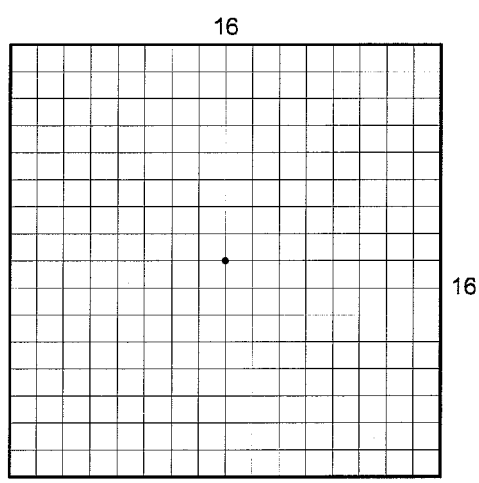
FIG. 2A illustrates a preferred embodiment of a sensor array employed in the present invention.

FIG. 2A depicts a CMOS image sensor of 16×16 array which can be used in a optical navigator (e.g. an optical mouse) of the present invention to capture a reference image and a series of successive sample images. While a 16×16 array is used in the preferred embodiment, other array sizes could also be used of course.

Figure 2B:
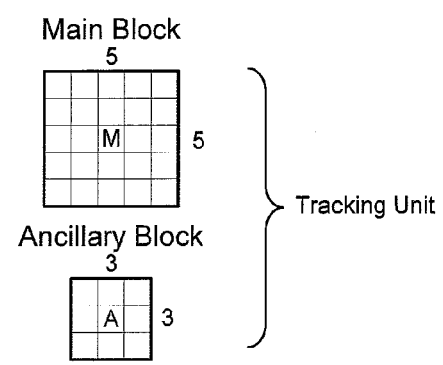
FIG. 2B illustrates a preferred embodiment of tracking unit associated with the sensor array.

FIG. 2B shows a tracking unit of the present invention, which includes both a main block (M) and at least one ancillary block (A). Both blocks are initially determined in a reference image (see discussion below). Preferably the main block is generally located near a center portion of the image and the ancillary blocks are smaller than the main block in size and spaced apart from the former by at least one pixel. For example, in FIG. 4B, a main block is comprised of a 5×5 block, and an ancillary block is comprised of a separate 3×3 block which is offset spatially. Again, it is also possible to overlap such blocks, and the exact size and relationship is expected to vary according to the desired application and performance requirements.

The advantage of using multiple blocks is that accuracy is improved since the smaller block acts as a form of motion verification or checker, and can help reduce problems associated with solutions which only examine a single sub-area of the image. In the latter case it is possible that changes in the image from frame to frame (due to light variations, reductions or distortions of the main block, etc.) can impair accuracy. The present invention thus provides a form of optical image redundancy checking.

Figure 3:
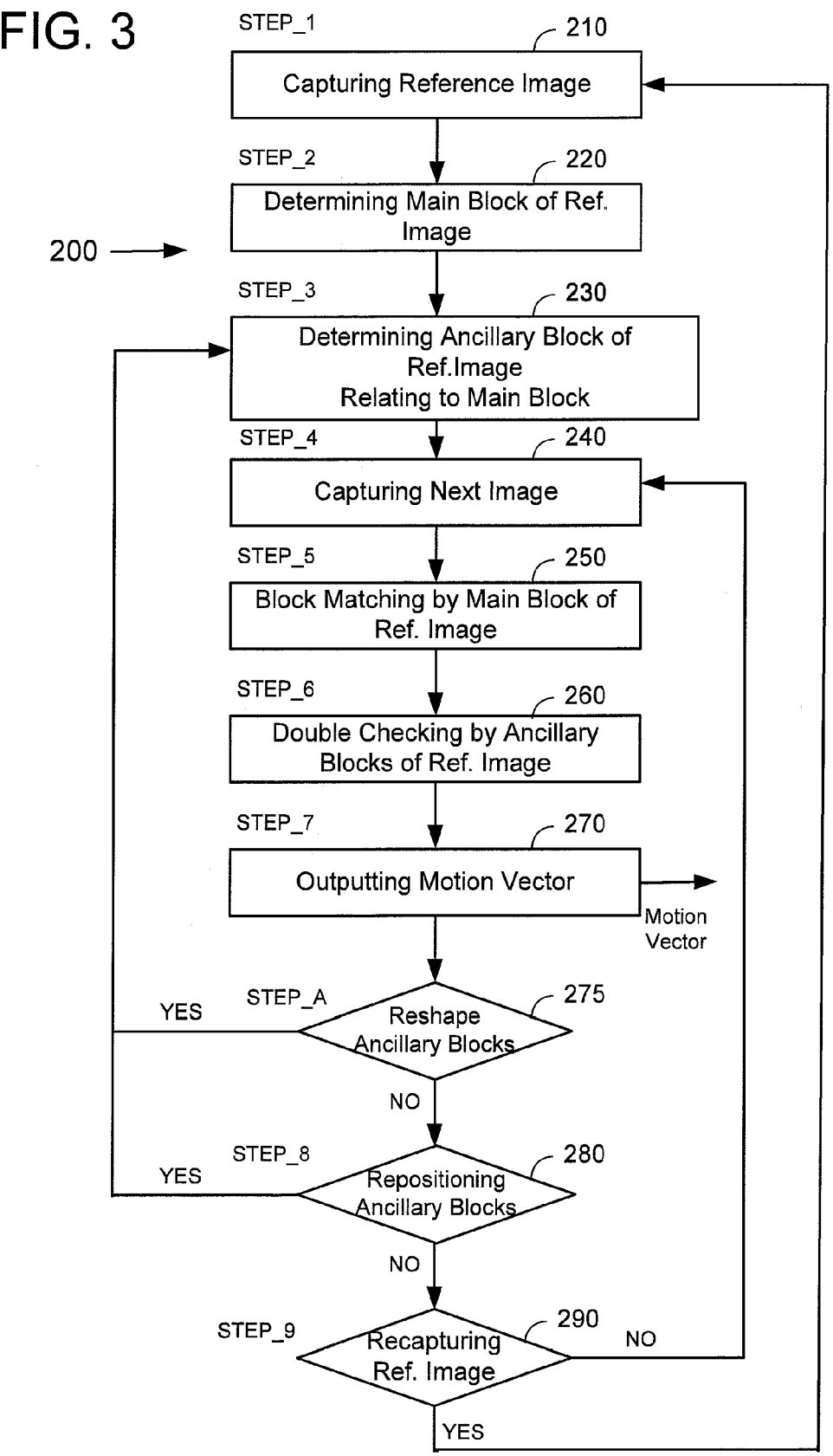
FIG. 3 depicts a flow diagram of a preferred embodiment of an optical navigator tracking process performed in accordance with the teachings of the present invention.

FIG. 3 depicts a flow diagram of a first embodiment of an optical navigator tracking process 200 performed in accordance with the teachings of the present invention. As noted above, these steps are preferably performed by processing module 120 using a DSP or other programmable processor using firmware routines which are stored (and can be loaded/changed) within system 100.

Thus, a first embodiment operates with the following operations:

STEP1: a first image is captured as a reference image in an operation 210;

STEP2: a main block (M) is determined in an operation 220 from the reference image; again, in a preferred embodiment a block is typically selected from a center portion of the image frame; nonetheless, as explained below, a main block (M) may not necessarily be in the form of a rectangular shape.

STEP3: at least one ancillary block (A) or feature relating to the main block (M) is determined by an operation 230. Again, as noted above, the ancillary block(s) or ancillary features is/are preferably smaller in size and spaced apart by a predetermined distance from the main block, so that there is an intermediate region between the two. Moreover, in a preferred approach, the ancillary block(s) is/are selected by examining a relative pixel intensity value of a candidate block against pixel intensity values of the main block. To increase discrimination capability it is desirable (in many cases) to select an ancillary block/feature which differs substantially in intensity value from the main block. Accordingly, an ancillary block can be chosen by ranking candidate blocks according to pixel intensity comparisons against the main block or some other optical benchmark known in the art. Hereafter, the main block and the ancillary block(s) are referred to as a tracking unit within the reference image, which can be considered to be a logical tracking unit since it can be altered (including from frame to frame if desired);

STEP4: a second image is captured subsequent in time in operation 240 to the first image as a sample image;

STEP5: block matching is performed by an operation 250 to located the main block (M) of the reference image in the second sample image to determine a shift in position of the sample image relative to the first image;

STEP6: double checking is performed by an operation 260 using the ancillary blocks (A) of the reference image in the sample image to confirm the shift in position of the sample image relative to the reference image. In certain situations, and in the event of a discrepancy between the main and ancillary block calculations, it may be desirable to average the two, or use some form of weighting based on whichever calculation yields the greatest correlation, and/or based on the assumption that the main block calculation is probably more accurate than the smaller ancillary block calculation because it encompasses a larger area. Furthermore, from a computation speed perspective, it may be desirable in some cases to automatically select a predicted position for block (A) based on the computed distance for block (M), and then calculate a correlation at such predicted position, and in limited offsets from the same (i.e., +/−1 or 2 pixels) to avoid doing a block comparison against an entire frame. If a correlation is not found for block (A) in such limited region, this would likely require a new ancillary block in any event, so it may be desirable to use this form of speculative computing in some cases.

STEP7: an operation 270 then outputs a motion vector based upon the shift in position; note that while a preferred embodiment outputs a motion vector from image to image, this is not strictly necessary, and instead a correlation could be performed based on non-sequential frames of data, and/or a vector only output when significant changes in position are in fact detected above a certain threshold.

STEPA: an operation 275 determines if one or more of the ancillary blocks should be re-shaped. For example, such step may be performed if the pixel values of the main block (M) and the ancillary block (A) are substantially the same, or uniform, thus suggesting that they are not tracking regions which differ significantly to improve performance. This is explained further below; other reasons for reshaping the ancillary blocks can also be employed.

STEP8: an operation 280 judges if the ancillary block (A) should be repositioned based on the detected motion and the known position of block (A). This may be done, for example, to prevent ancillary block (A) from being lost in a subsequent sample image because it is too near an edge. If "Yes", the process proceeds to STEP3, if "No", the process goes to STEP9;

STEP9: an operation 290 determines if the reference image should be replaced, again, using conventional techniques. If the reference image is to be replaced, then the process goes STEP1, otherwise, it proceeds to STEP4.

Accordingly, the flow diagram of FIG. 1 illustrates logically how an optical navigator employs a tracking unit of one 5×5 main block and one 3×3 ancillary block in the reference image to determine a motion vector of a moving image. It will be apparent to those skilled in the art that not all steps associated with image correlation are included here in order to better present the invention, and that additional operations could be used to supplement the above as part of a conventional system.

Moreover, it will be appreciated that the aforementioned steps do not have to be performed in the precise sequence shown, and that other combinations could be used as desired. For example, the main block and ancillary block operations could be performed in reverse order. The same is true for operations involving the relocation of ancillary blocks and recapturing of the reference image. In some cases a preliminary/predicted motion vector may be output after step 250, instead of waiting for the end of checking operation 260. If the preliminary vector is incorrect an update can then be provided at step 270. Furthermore it should be noted that operation 260 may be performed multiple times depending on the number of ancillary blocks and desired accuracy. Other examples will be apparent which can be performed consistent with the present teachings.

FIGS. 4A-4B are a graphical depiction of the preferred embodiment of an overall image capturing process in accordance with the present invention. In FIG. 4A, Step_1 (capturing reference image—operation 210) Step_2 (identifying a main block (M)—operation 220) and Step_3 (identifying one more ancillary blocks—operation 230) are shown. Again, as noted earlier, ancillary block (A) is preferably selected by examining a candidate set of sub-blocks and choosing one based on such factors as a relative pixel intensity value compared to main block (M), a predicted direction of travel, etc.

FIG. 4B shows Step_4 (capturing a new sample image in operation 240), Step_5 (matching of block (M) (shown in broken outline in prior position) with an operation 250 to a new position in the sample image) and Step_6 (matching of block (A) (shown in broken outline in prior position) with an operation 260 to a new position in the sample image). Step_7 then outputs a motion vector using operation 270 as shown.

Figures 5E, 5F, 5G, 5H:
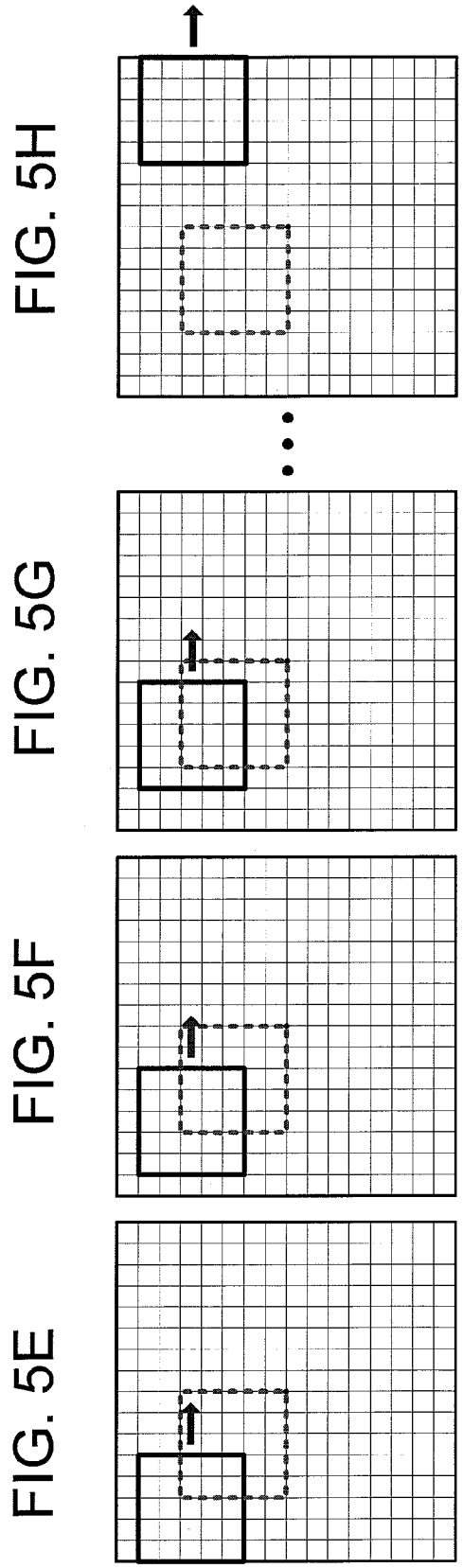
Figure 5J:
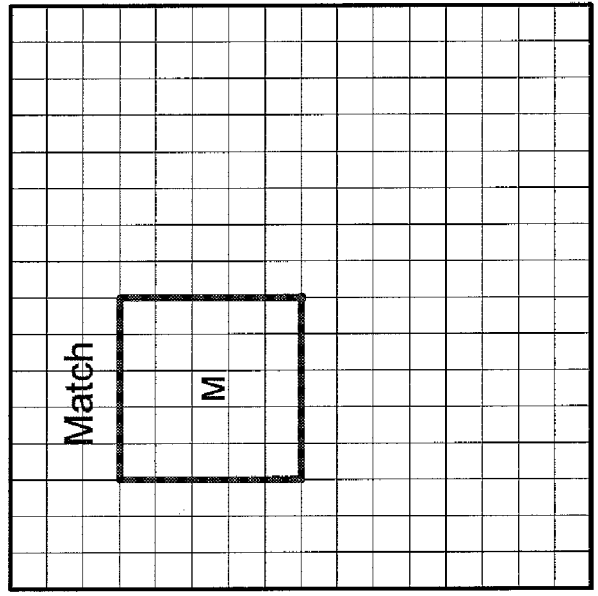
Figure 5I:
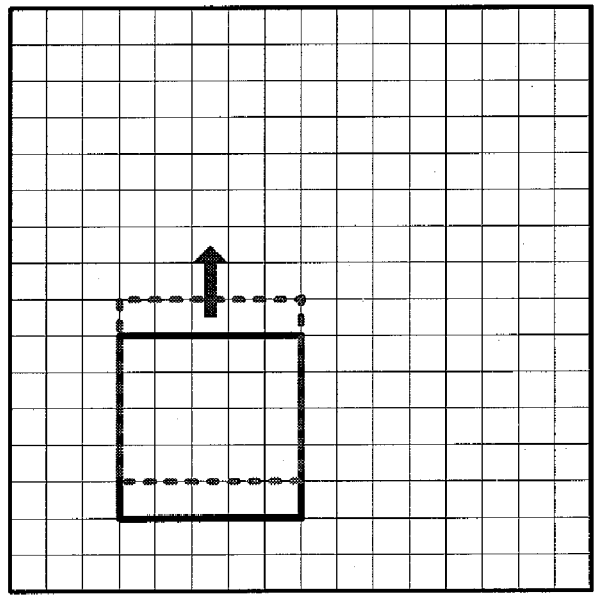

FIGS. 5A-5J are a graphical depiction of a preferred embodiment of a main or primary block matching operation 250 (Step_5) implemented in accordance with the present invention. As can be seen, a main block (M) is detected within a new frame by starting at an initial position in an upper row of an upper left corner of a 16×16 frame (representing logical pixel values of the sensor array 110 stored in memory 130) at FIG. 5A and then progressively shifting over one (or more) pixel(s) at a time in a linear fashion across a set of columns (5B, 5C) until the end of the row is reached (FIG. 5D). The process is repeated (FIG. 5E) for a row that is offset by one or more pixels. Since there are 12 horizontal and 12 vertical positions, it can be seen that a maximum of 144 separate correlations are performed; however, those skilled in the art will appreciate that this number will be a function of both the main block (M) size and the array size, and the invention is not so limited. A match is then determined as shown in FIGS. 5I and 5J. At this point the process can be discontinued, or a further comparison can be made if desired to ensure the accuracy of the match against other subblocks of the frame. While the above process starts in an upper left corner of the frame, it will be apparent to those skilled in the art that other starting points and directions of travel could be used. Furthermore, it may be desirable to start in a corner that best correlates to a prediction of motion for the main block, and/or to only check a limited region of the frame based on a predicted location of block (M) based on a prior motion vector. For example if block (M) is detected to be moving with a vector +2, +2 (x, y coordinates) it may be desirable to begin checking in an next frame from an upper right hand corner, and/or to begin a search in an upper quadrant.

Figure 6E:
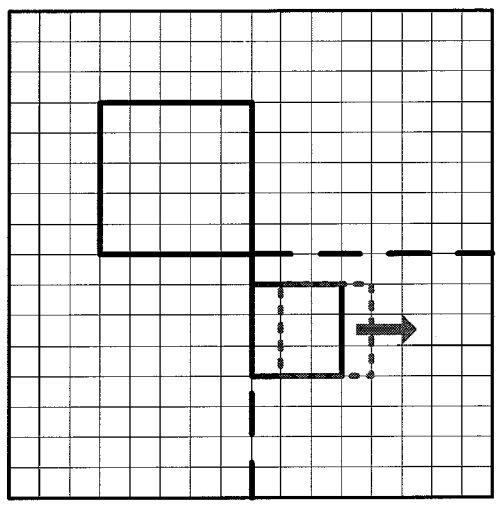
Figure 6F:
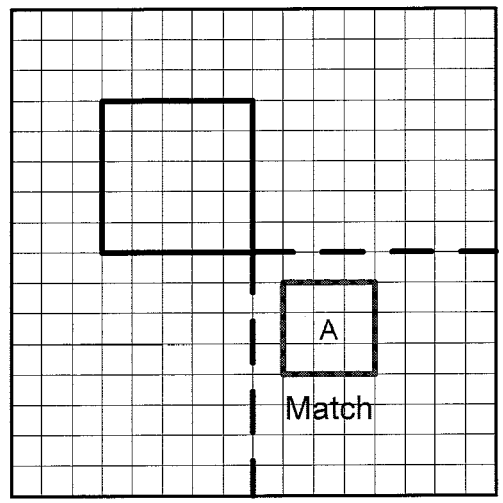

FIGS. 6A-6F are a graphical depiction of a preferred embodiment of a secondary/supplemental or ancillary block matching operation 260 (Step_6) implemented in accordance with the present invention. As can be seen, after a main block (M) is detected within a new frame, the inventive process defines and predicts a narrow subportion of the frame as an area to be searched for the ancillary block (A). Thus, at FIG. 6A, operation 260 starts at an initial position in an upper row of an upper left corner of a sub block of the 16×16 frame (representing a subset of the logical pixel values of the sensor array 110 stored in memory 130). In the preferred approach the sub-block includes a region bounded by horizontal and vertical lines extending from a corner of main block (M). As with the main block (M), a matching operation progressively shifts over one (or more) pixel(s) at a time in a linear fashion across a set of columns (6B, 6C) until the end of the row is reached (FIG. 6D). The process is repeated (FIG. 6E) for a row that is offset by one or more pixels. Since there are 6 horizontal and 6 vertical positions, it can be seen that a maximum of 36 separate correlations are performed; again however, those skilled in the art will appreciate that this number will be a function of both the ancillary block (A) size, the main block (M) size, the location of (M), and the array size, and the invention is not so limited. A match is then determined as shown in FIG. 6F. At this point the process can be discontinued, or a further comparison can be made if desired to ensure the accuracy of the match against other subblocks of the frame. Again, in some embodiments it may be advantageous to predict a location of block (A) in advance based on a prior motion vector, and only check a limited region of the frame.

In a preferred embodiment the block matching for both the main block (M) and ancillary block (A) use one or more well-known formulas for pixel correlations based on comparison with a threshold (T), or a minimum, such as:

$$\sum_{i=1}^{25} |X_i - Y_i| \le T$$

Or $$\sum_{i=1}^{25} |X_i - Y_i| \to \text{minimum}$$

where Xi is the element of main block of the sample image, Yi is the element of main block of the reference image, and T is the predetermined threshold. Other algorithms could be used of course, and the invention is not limited in this respect.

In some embodiments both the main block (M) and ancillary block (A) can be located/matched simultaneously by using the combined tracking unit which is formed by the main and ancillary blocks as illustrated in FIGS. 7A-7J. In this approach a correlation is done on two different blocks at the same time. Thus, in FIG. 7A both the (M) and (A) blocks are checked in the new sample frame. Each is also shifted by one pixel horizontally as shown in FIGS. 7B, 7C, 7D, etc. At FIG. 7E, the blocks are also shifted by one pixel vertically as well and the process is repeated as shown in FIGS. 7F, 7G and 7H. At FIG. 7I the blocks begin to encroach on the new position (yielding a closer correlation), and at 7J a match is determined by a comparison on both blocks.

Figure 8B:
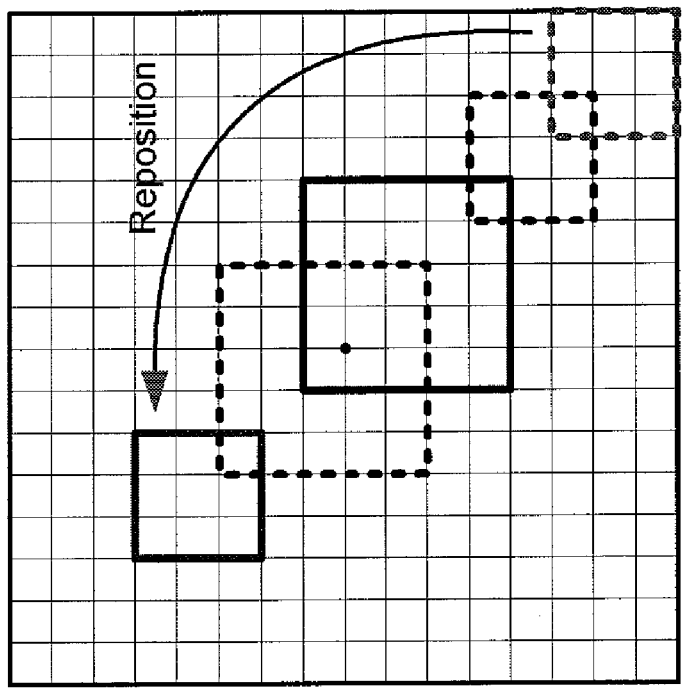
Figure 8A:
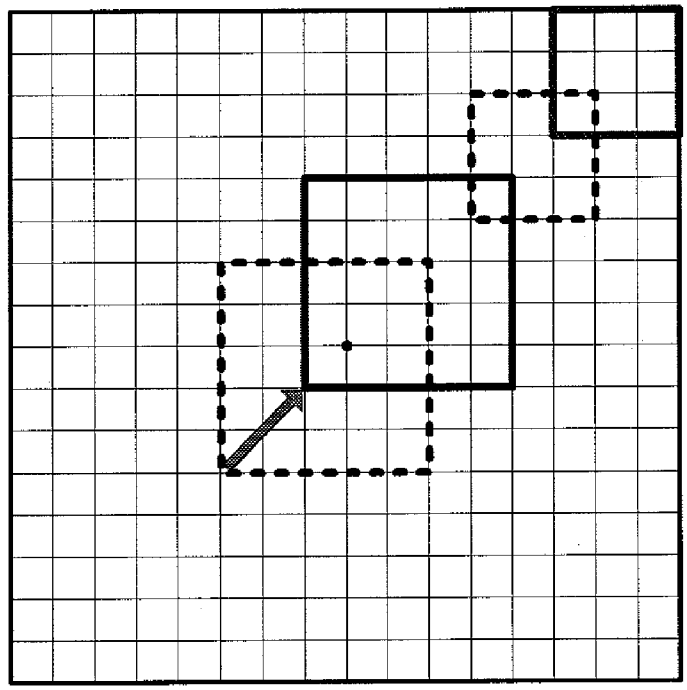

In situations where the ancillary block begins to approach an edge of the frame, repositioning operation 280 is preferably performed. FIGS. 8A-8F are a graphical depiction of a preferred embodiment of such process implemented in accordance with the present invention. As seen in FIG. 8A, when an ancillary block (A) is detected in a corner position (other positions are also possible of course) a repositioning is done to move the ancillary block to a new ancillary block location shown in FIG. 8B. In this instance a new block is selected by rotating around an axis perpendicular to the measured motion vector. Again, the precise position may vary as well depending on a relative pixel intensity of the new proposed ancillary block position, and many positions may be evaluated for selecting a new ancillary block. The selection in FIG. 8B also makes use of the motion vector information as well to intentionally select a block that is likely to remain and in fact be centrally located in an next sample image frame. A similar situation is depicted in FIGS. 8C and 8D. In this situation, however, since the ancillary block is approach a horizontal edge, the block is instead flipped about an axis parallel to such edge to be repositioned to the left of the main block, instead of the right as used before. Again other examples will be apparent to those skilled in the art, and the particular strategy to be employed can be varied by application and on a frame by frame basis if necessary.

Figure 8F:
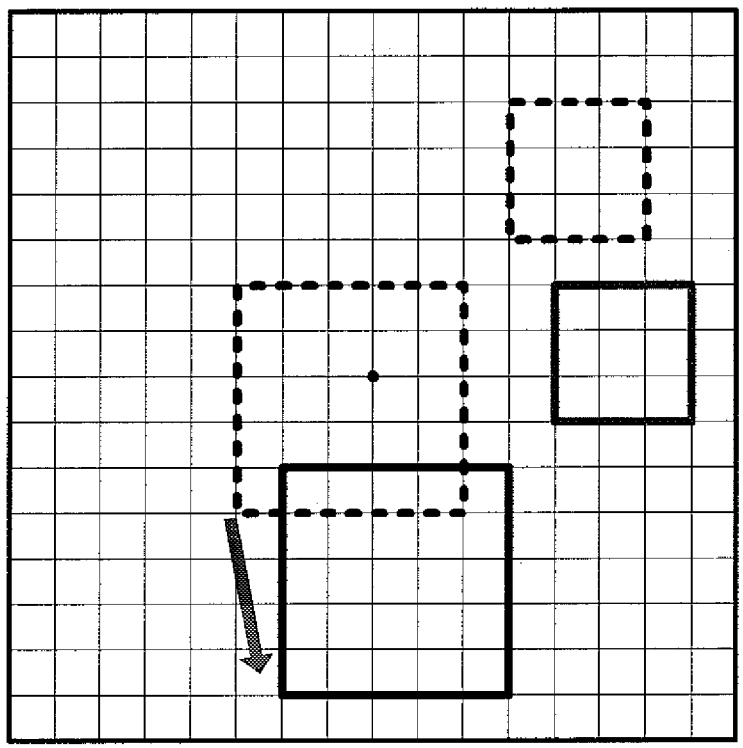
Figure 8E:
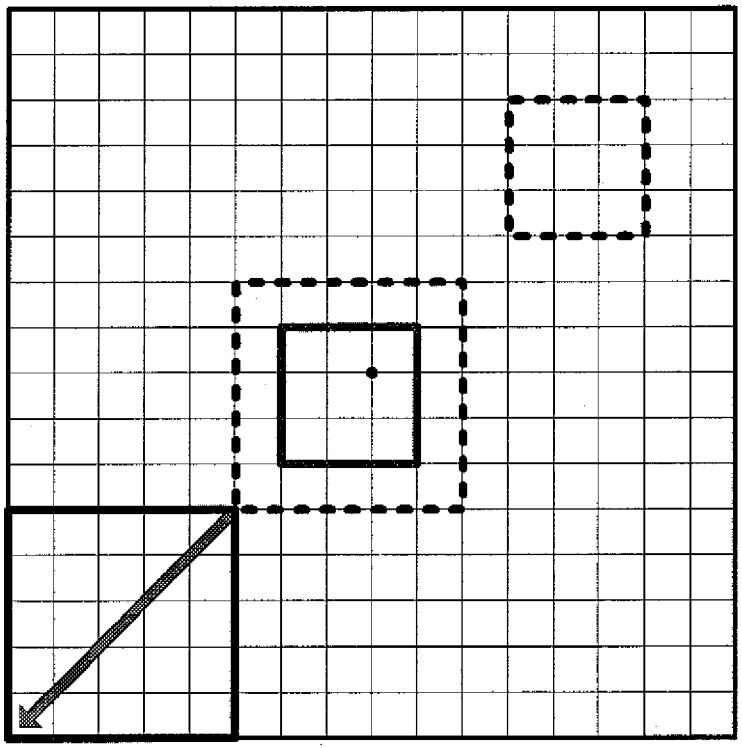

FIGS. 8E and 8F depict situations in which a main block (M) begins to encroach on an edge of the sensor array. In these cases, the reference image is preferably replaced with a new one by image sensor capturing in an operation 290. Alternatively, or in addition thereto, a new main block (M) and a new ancillary block (A) is selected as well.

By using the above tracking unit method, one can appropriately adjust the position of the ancillary block relative to the main block and the numbers of ancillary blocks to satisfy various image conditions and to efficiently detect the motion of the image.

As alluded to earlier, it may be desirable to also re-shape or re-select the ancillary block(s) in an operation 275 (Step_A). FIGS. 9A-9B are a graphical depiction of a preferred embodiment of an ancillary block reshaping process implemented in accordance with the present invention. As seen in FIG. 9A, an average pixel intensity value identified for a proposed ancillary block is relatively close to an average pixel intensity identified value for the main block (M). Under this condition, the benefit of the ancillary block is reduced since it does not contribute any significant new information to the correlation process. For this reason a new ancillary block is preferably selected from a replacement region as shown in FIG. 9B, in which an average pixel intensity value is much different from the main block than the prior proposed ancillary block.

Other situations may also call for reshaping/repositioning the ancillary blocks. For instance, it may be determined that in some environments rapid movement of the navigator causes distortion in a travel direction of the pointing device. In other words, an image can be distorted due to rapid movement which challenges a sampling rate; it is desirable to keep the latter small to reduce power, etc. A re-shaping of the ancillary blocks, therefore, may be done to compensate for a direction and amplitude of motion, so that a new block has a geometry that is less susceptible to distortion and error in a comparison process. As an example, when rapid motion is detected in a horizontal direction, a new ancillary block which has a relatively larger dimension in a vertical direction can be employed, and vice-versa.

Figure 10G:
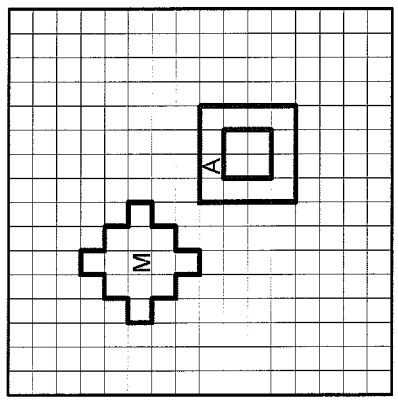
Figure 10F:
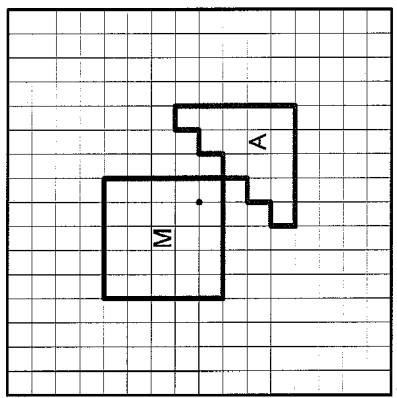
Figure 10E:
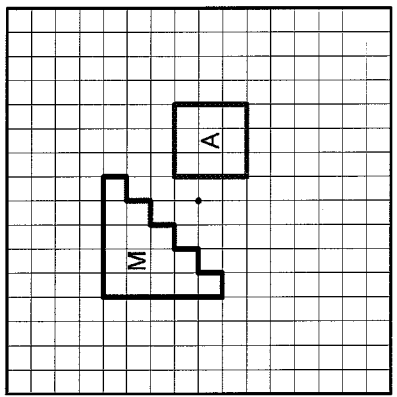
Figure 10D:
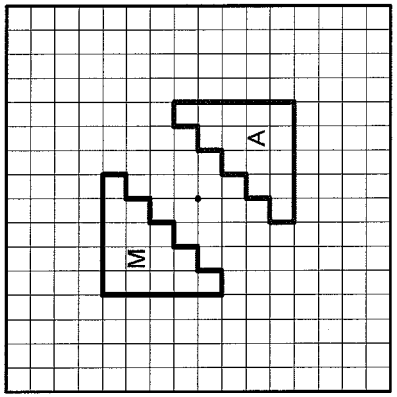

In addition to the embodiments noted above, FIGS. 10A-10K are a graphical depiction of a number of exemplary variants of a tracking unit which can be used in accordance with the present invention. It can be seen that the tracking unit can be based on a variety of main block shapes and ancillary block/feature shapes. In some applications it may be desirable to use contiguous blocks (FIGS. 10A, 10B), spaced apart blocks (FIG. 10C), irregular (e.g. non-rectangular) matching shapes (FIG. 10D), combinations of irregular and regular shapes (FIGS. 10E, 10F), multiple ancillary block shapes (see FIGS. 10I, 10J, 10K), multiple overlapping ancillary block shapes (FIG. 10G) and even overlapping main block and ancillary block shapes (FIG. 10H). Thus, it should be understood that as used herein, a "block" or "feature" does not necessarily represent a rectangular/square physical block, and that either or both of said main block and ancillary block may be irregularly shaped. Other examples will be apparent to persons skilled in the art based on the present disclosure.

It should be apparent that the firmware routines used by the processing module 120 to implement the present inventive processes described above can be embodied in well-known ways in an article of manufacture such as in traditional computer-readable media commonly used to transport such programs. These can include a flash drive, a floppy disk, tape, hard disk, optical drive, or equivalent non-volatile storage system. In this format, the routines can be transported easily. Alternatively in the above routines can be implemented as part of a non-volatile storage portion of a stand-alone integrated circuit, or embedded as part of a non-volatile storage structure in an architecture of a typical DSP, microprocessor or RISC processor. The instructions for carrying out such routines can be encoded or implemented in silicon or metal as is done with other program ROMs, and using conventional manufacturing techniques.

Furthermore it will be apparent to those skilled in the art that what is set forth herein is not the entire set of routines that can be used, or an exhaustive list of all operations executed by such routines. It is expected, in fact, that other features will be added by optical navigator designers in accordance with customer preferences and/or system performance requirements.

In addition it will be apparent to those skilled in the art that an optical navigator system implementing the present invention may not include all of the routines as noted above, depending on the needs, requirements or desires of its intended users, and other technical limitations. Thus, the invention is not limited to the preferred embodiments noted above. Finally, while not explicitly shown or described herein, the details of the various software routines, executable code, etc., required to effectuate the functionality discussed above in such modules are not material to the present invention, and may be implemented in any number of ways known to those skilled in the art based on the present description.

The above descriptions are intended as merely illustrative embodiments of the proposed inventions. It is understood that the protection afforded the present invention also comprehends and extends to embodiments different from those above, but which fall within the scope of the present claims.

What is claimed is:

1. A method of determining a motion vector associated with a set of moving images using an electronic image sensor, comprising:

capturing a first image corresponding to a first region;

determining a main block from the first image including a main block region which is smaller than said first region;

determining at least one ancillary block relating to the main block from the first image said ancillary block including an ancillary block region which is also smaller than said first region, wherein the main block and the ancillary block form a tracking unit in the first image;

capturing a second image subsequent in time to the first image using the image sensor;

correlating the first image to the second image using the tracking unit to determine a first change in position in said main block and a second change in position in said ancillary block; and outputting the motion vector of said first image and said second image based upon said first and second changes in position.

2. The method of claim 1, wherein the process of correlating comprises:

block matching of the main block of the first image in the second image to determine a shift in position of the main block in said second image relative to the first image; and checking to confirm the shift in position of the second image relative to the first image using said ancillary blocks of the first image in the second image.

3. The method of claim 1, wherein said ancillary block is smaller in area than said main block.

4. The method of claim 1, further including a step: evaluating a candidate set of ancillary blocks by comparing pixel values of said candidate set of ancillary blocks to said main block.

5. The method of claim 1, wherein said tracking unit includes a plurality of separate ancillary blocks.

6. The method of claim 5 wherein said plurality of ancillary blocks include at least two blocks which differ in size and/or shape.

7. The method of claim 1, further including a step: selecting said main block from a middle region of said first image.

8. The method of claim 4, further including a step: selecting an ancillary block from said candidate set of ancillary blocks which differs most in pixel intensity value from said main block.

9. The method of claim 1, further including a step: re-positioning the ancillary block based on an analysis of a position of such ancillary block within said second image.

10. The method of claim 1, further including a step:
re-positioning the ancillary block based on an analysis of said motion vector.

11. The method of claim 1, further including a step: re-shaping the ancillary block based on an analysis of optical characteristics of said ancillary block region relative to optical characteristics of said main block region.

12. The method of claim 1, further including a step:
re-shaping the ancillary block based on an analysis of said motion vector.

13. The method of claim 1, further including the steps of:
computing a predicted location of said main block and/or said ancillary block within said second image; and
performing said correlating beginning in a limited region and/or at around said predicted location.

14. The method of claim 1, wherein said correlating is terminated for determining said shift in position upon detecting a correlation that exceeds a threshold value.

15. The method of claim 1, wherein said motion vector is based on detecting a first shift in position in said main block and a second shift in position in said ancillary block, and computing an estimated shift in position based on said first shift and said second shift.

16. The method of claim 15, wherein said estimated shift is a weighted average of said first shift and said second shift.

17. The method of claim 1, wherein said main block and said ancillary block are combined so that said correlating is performed at the same time for both said main block and said ancillary block.

18. The method of claim 1, wherein at least one of said main block and said ancillary block has an irregular shape that is not rectangular.

19. The method of claim 1, wherein said second image and said first image are non-sequential images captured by the image sensor.

20. An optical navigator system comprising:
an image sensor array adapted to capture a first image corresponding to a first region and a second image subsequent in time corresponding to a second region; and
a processing circuit which is adapted to:
 a. determine a main block from the first image including a main block region which is smaller than said first region;
 b. determine at least one ancillary block relating to the main block from the first image said ancillary block including an ancillary block region which is also smaller than said first region;
 c. form a tracking unit including said main block and said ancillary block;
 d. correlate the first image to the second image using the tracking unit to determine a position of said main block in said second image and a position of said ancillary block in said second image; and
 e. output the motion vector of said first image and said second image based on positions of said main block and said ancillary block in said first image and said positions of said main block and said ancillary block in said second image.

21. The optical navigator system of claim 20, wherein said processing circuit includes a DSP and a set of executable program instructions.

22. An optical navigator comprising:
an image sensor configured to capture a first image and a second image;
means for determining a main block from the first image;
means for determining one or more ancillary block(s) relating to the main block from the first image;
wherein the main block and the one or more ancillary block(s) form a tracking unit in the first image;
means for capturing a second image subsequent in time to the first image using the image sensor;
means for correlating the first image to the second image using the tracking unit of the first image to determine a position of said main block in said second image and a position of said ancillary block in said second image, wherein the process of correlating comprises:
 matching said main block of the first image to a location in the second image to determine a change in position of the second image relative to the first image;
 verifying said change in position by identifying a location of said one or more ancillary blocks in said second image relative to the first image; and
means for outputting the motion vector of said first image and said second image based on positions of said main block and said ancillary block in said first image and said positions of said main block and said ancillary block in said second image.

* * * * *